United States Patent [19]

Terade et al.

[11] 4,270,066

[45] May 26, 1981

[54] MINIATURE MOTOR FOR AN ELECTRONIC TIMEPIECE INCLUDING A STATOR HAVING A NON-MAGNETIC REINFORCING RING

[75] Inventors: Kiichi Terade, Tokyo; Yasuhiro Iida, Funabashi, both of Japan

[73] Assignee: Kabushiki Kaisha Daini Seikosha, Tokyo, Japan

[21] Appl. No.: 1,789

[22] Filed: Jan. 8, 1979

Related U.S. Application Data

[63] Continuation-in-part of Ser. No. 686,502, May 14, 1976, abandoned.

[30] Foreign Application Priority Data

May 16, 1975 [JP] Japan ................................ 50-59148

[51] Int. Cl.[3] ................................................ H02K 1/12

[52] U.S. Cl. ............................. 310/258; 310/40 MM; 310/91; 310/218

[58] Field of Search ................... 310/49, 40 MM, 156, 310/162, 163, 164, 172, 83, 89, 254, 258, 259, 91, 42, 218; 58/23, 230

[56] References Cited

U.S. PATENT DOCUMENTS

| | | | |
|---|---|---|---|
| 3,256,453 | 6/1966 | Hydon | 310/156 |
| 3,949,251 | 4/1976 | Takatsuki | 310/49 R |
| 3,978,651 | 9/1976 | Yoshino | 310/40 MM |
| 3,979,616 | 9/1976 | Stechmann | 310/49 R |
| 4,041,336 | 8/1977 | Sudler | 310/49 R |

FOREIGN PATENT DOCUMENTS

| | | | |
|---|---|---|---|
| 1334 | 4/1979 | European Pat. Off. | 58/23 D |
| 2426583 | 5/1974 | Fed. Rep. of Germany | 310/40 MM |
| 2817622 | 10/1978 | Fed. Rep. of Germany | 58/23 D |

*Primary Examiner*—R. Skudy

*Attorney, Agent, or Firm*—Robert E. Burns; Emmanuel J. Lobato; Bruce L. Adams

[57] ABSTRACT

In an electronic timepiece motor, a one-piece stator of magnetic material having a hole therethrough bounded by a circumferential sidewall and defining a pair of stator portions connected by narrow bridges having small cross sections. The narrow bridges define a magnetic circuit of high magnetic resistance between the stator portions. A non-magnetic reinforcing ring is disposed within the hole through the one-piece stator and has an outer diameter effective to insure a snug fit of the reinforcing ring with the circumferential sidewall defining the hole through the stator. The reinforcing ring imparts stiffness to the one-piece stator to prevent deformation of the bridges and the hole. The reinforcing ring has a peripheral reinforcing flange extending outwardly and with the flange bearing against the one-piece stator adjacent the hole therethrough for imparting additional stiffness to the one-piece stator. A rotor is mounted for rotation within the hole through the one-piece stator and within the reinforcing ring.

13 Claims, 3 Drawing Figures

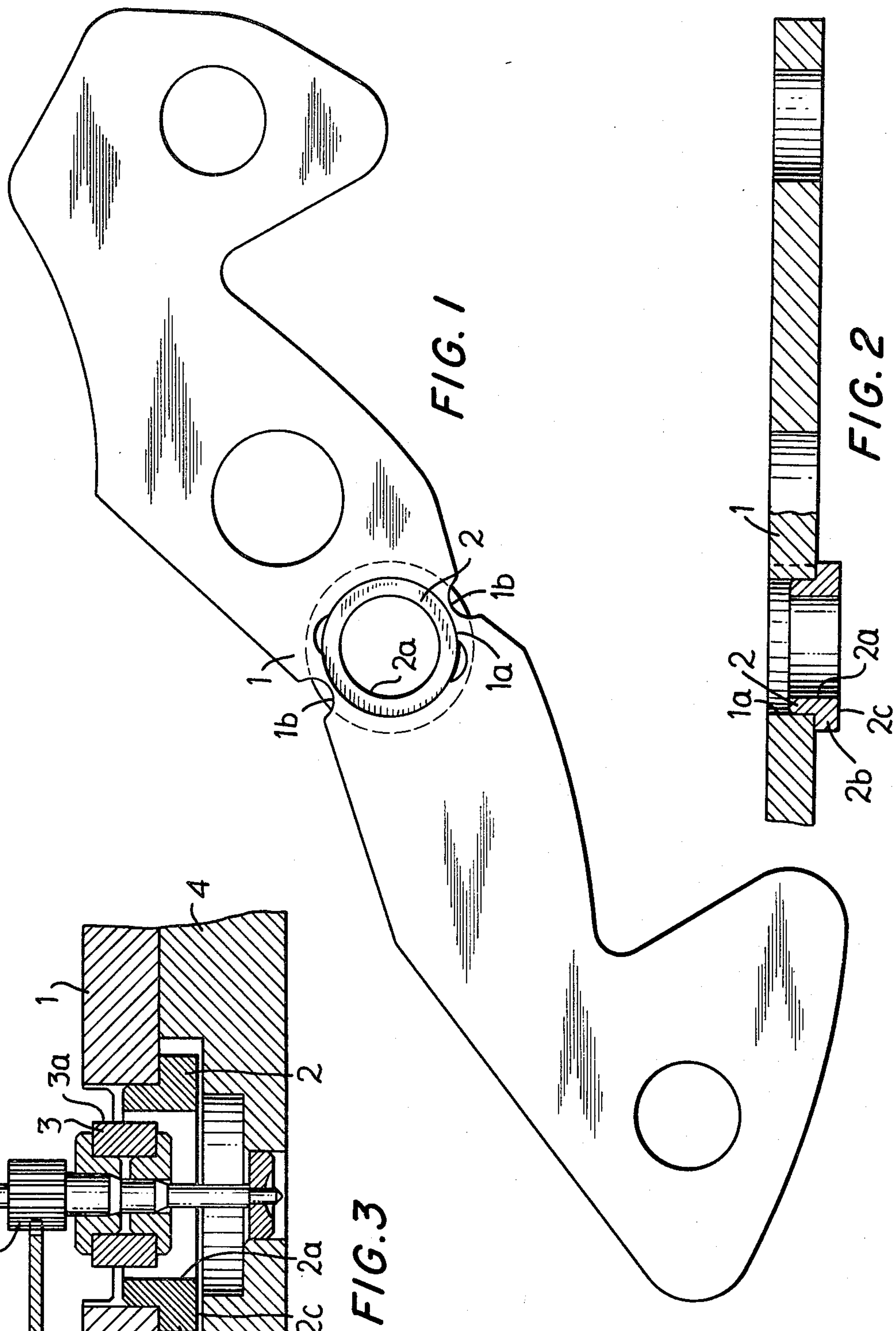
FIG. 1
FIG. 2
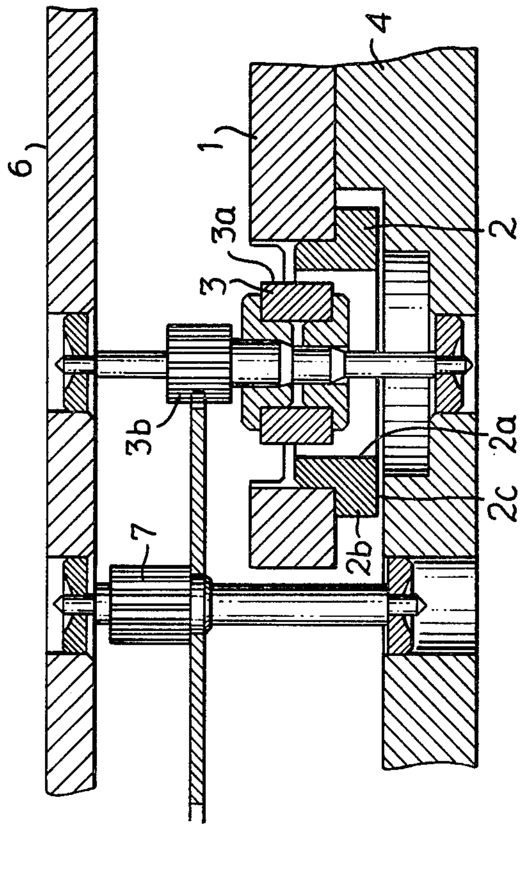
FIG. 3

MINIATURE MOTOR FOR AN ELECTRONIC TIMEPIECE INCLUDING A STATOR HAVING A NON-MAGNETIC REINFORCING RING

RELATED APPLICATIONS

This is a continuation-in-part application of prior copending application Ser. No. 686,502 filed May 4, 1976 and now abandoned.

BACKGROUND OF THE INVENTION

The present invention relates to an electronic timepiece motor which comprises a permanent magnet rotor and a stator made of magnetic members, and more particularly to the stator structure which includes a non-magnetic reinforcing member.

A stator for use in an electronic timepiece motor is generally made in pairs (two pieces), and each of the stator pieces have semi-cylindrical surfaces which are opposite a rotor. There are, however, several disadvantages associated with the conventional stator. Namely, two piece stators result in a double cost since raw materials of the stator are magnetic material such as permalloy, pure iron, silicon-steel plate or the like which are exceedingly expensive in themselves, and which are poor in workability and the processing costs of punching, annealing or the like are very high. Moreover, since a pair of opposing stators should be positioned accurately upon completion of the assembling process, adjustable positioning structure which enables the position adjustment of the stator pieces after assembling is required.

To eliminate the adjusting process, a one-piece stator is first mounted on a stainless steel plate by means of a pin, caulking, welding or the like and then only the stator portion is cut to separate the one-piece stator into two pieces. However, this technique is troublesome and cannot solve the cost problem.

On the other hand, in order to eliminate the above mentioned problems, a one-piece stator is used. The form of one-piece stator is like a pair of conventional opposed stator pieces coupled together. The sectional area of a coupling portion is greatly reduced in order to generate a leak-off magnetic field at the surrounding portion of the rotor due to saturation caused by enhancement of magnetic resistance. The rotation efficiency is excessively diminished under the influence of the above mentioned leak-off magnetic field if the sectional area is too large and it may not be used in a timepiece which necessitates accuracy. Moreover, since the sectional area is exceedingly small, it is apt to be formed during the process of timepiece assembly or the like, and therefore the rotation efficiency may be degraded due to the deformation of the sectional area. Thus, the one-piece stator has drawbacks which prevent its practical use.

SUMMARY OF THE INVENTION

The object of the present invention is to eliminate the drawbacks of conventional stators and provide a highly reliable stator which is inexpensive, requires no adjustment, is capable of being mass produced, and which has sufficient efficiency and rigidity for use in an electronic watch, thereby to reduce a cost of an electronic watch.

The present invention is an electronic timepiece transducer or motor comprising a one-piece stator having a hole therethrough wherein a part of a stator adjacent the hole is a bridge formed with a thin width minimizing the sectional area of the bridge in order to enhance the magnetic resistance thereof. A reinforcing ring is fixed within the hole to reinforce the thin bridge, as well as to prevent dropping of the rotor during assembly.

BRIEF DESCRIPTION OF THE DRAWINGS

FIG. 1 shows a plan view of a stator and a reinforcing ring according to the present invention;

FIG. 2 is the sectional view of FIG. 1; and

FIG. 3 is the fragmentary sectional view of a timepiece which has a motor including the stator and reinforcing ring according to the present invention.

DESCRIPTION OF THE PREFERRED EMBODIMENT

FIG. 1 is a plane view of a stator and FIG. 2 is a sectional view of the stator illustrated in FIG. 1. The one-piece stator 1 is made of magnetic material, and the stator is magnetized in use by a magnetic coil (not shown in the drawing) mounted on the stator. A hole through the stator 1 is defined by the sidewall 1*a* which surrounds a permanent magnet rotor 3 (See FIG. 3) (which may include a magnetic coating), and thin width portions or bridges 1*b*, 1*b* minimize the sectional area to enhance the magnetic resistance of the bridge portions of the stator. The bridges are formed adjacent the inner circumferential sidewall 1*a* surrounding the rotor 3. The thin width portions or bridges 1*b*, 1*b* are formed simultaneously with or separately from the outer periphery of the stator by means of stamping or the like, and the bridges are less than 0.5 millimeters in width. In a stator for an ultra-miniature motor the bridges have widths of about 0.1 mm.

Numeral 2 is a reinforcing ring made of non-magnetic material having an inner circumferential surface 2*a* in the proximity of an outer surface 3*a* of the rotor 3, a width less than 0.5 millimeters, and having a reinforcing flange 2*b*. The reinforcing ring 2 is fixed in the hole having the sidewall 1*a* through the stator 1 by stamping, and the reinforcing flange 2*b* is positioned at and adjacent the front or the reverse major surface of the stator 1. The means of fixing the reinforcing ring 2 to the stator 1 is not limited to stamping but adhesives can be applied or, if the reinforce ring is made of a material such as synthetic resin, a force fit is possible.

The outer diameter of the reinforcing ring 2 is effective to ensure a snug fit of the reinforcing ring 2 within the hole defined by sidewall 1*a* to impart stiffness to a portion of the one-piece stator 1 surrounding the hole therethrough including the narrow bridges 1*b*. Additionally, the peripheral reinforcing flange 2*b* extending outwardly circumferentially of the reinforcing ring bears against a portion of a major surface of the stator 1 adjacent the hole therethrough for imparting additional stiffness to the portion of the stator 1 surrounding the hole, includingthe narrow bridges 1*b*. The preferred embodiment of the reinforcing ring illustrated is in continuous contact with a substantial portion of the sidewall 1*a* of the hole through the one-piece stator 1.

FIG. 3 shows a sectional side view of the one-piece stator 1, the reinforcing ring 2 and the rotor 3 assembled and mounted in a timepiece mechanism. As illustrated in the drawing, 4 is a plate, the stator 1 is mounted on the plate 4 with both ends fixed thereto and 6 is a bridge member positioned opposite the plate 4 and the stator 1. The flange 2*b* of the reinforcing ring 2 fixed to the stator 1 is in the proximity of or in contact with the plate 4. The rotor 3 has a pair of axial rotor shaft portions 8, 9 extending axially therefrom and is axially rotatably mounted in the space between the plate 4 and bridge 6. An end of each of the rotor shaft portions 8, 9 mounted on the plate 4 and bridge 6, respectively. Rotation is transmitted from a rotor pinion **3*b* to a timepiece gear train 7. The plate 4 and bridge member 6** comprise mounting means for mounting the rotor for rotation within the hole through the stator.

The present invention having structure according to the foregoing description includes a stator which is rigid and which bears up against the deformation caused by impact force which ordinarily, when applied to a timepiece, will cause stator deformation. This rigid stator is realized by use of the reinforcing ring 2. Therefore improvement in efficiency is achieved by narrowing the thin width bridges **1*b* which constitute the connecting portions of the two halves of the one-piece stator, while the rigidity of a ultra small-sized stator in a ultra small-sized timepiece is sufficient due to the reinforcing flange 2*b* of the reinforcing ring 2**.

Additionally, the process of timepiece assembly is easy and can be automated because the reinforcing ring 2 protects the rotor 3 since the outer circumferential surface **3*a* of the rotor is in the proximity to the inner circumference of the reinforcing ring 2 so the rotor is kept from falling over during the process of timepiece assembling before the bridge member 6 is installed and when the rotor shaft is unsupported by the bridge member 6. On the other hand, since the flange 2*b* of the reinforcing ring 2** is in the proximity of or in contact with the plate of the timepiece mechanism, the reinforcing ring is protected. Accordingly, the present invention provides a highly reliable electronic timepiece transducer which realizes the object of the invention.

The high degree of ultra-miniaturization which can be realized in an electronic timepiece motor using the stator and reinforcing ring according to the present invention is illustrated by a range of dimensions at which the present invention can be practiced.

Reinforcing Ring
- Outer Diameter: about 1.2 to 2.2 mm
- Width: about 0.1 to 0.5 mm
- Inner Diameter: Outer Diameter minus twice the width
- Thickness: about 0.15 to 1.0 mm Stator bridge portion width: about 0.1 mm
Stator material: 78 permalloy These ranges of dimensions are practical. The stator and reinforcing ring according to the present invention allow the realization of ultra-miniature electric watch motors which are efficient and provide useful power outputs and which at the same time are reliable and impervious to mechanical shocks which normally would damage electrical motors of conventional design and the same size.

We claim:

1. The combination of a stator for a miniature electric motor for an electronic timepiece, and a reinforcing ring for reinforcing the stator comprising: a platelike one-piece stator of magnetizable material having a pair of opposite major surfaces and a hole defined by a sidewall extending through said one-piece stator and opening at said major surfaces and dividing said one-piece stator into a pair of stator portions connected together by narrow bridges of magnetizable material having narrow cross sections; and a reinforcing ring made of non-magnetic material disposed within the hole through said one-piece stator, said reinforcing ring having a circumferential outer surface in continuous contact with a substantial portion of the sidewall of the hole through said one-piece stator and said reinforcing ring having an outer diameter effective to ensure a snug fit of said reinforcing ring within the hole through said one-piece stator to impart stiffness to a portion of said one-piece stator surrounding the hole therethrough including said narrow bridges for preventing deformation of said narrow bridges of said stator and the hole through said one-piece stator due to mechanical impact forces to which said one-piece stator is subjected.

2. The combination of a stator and a reinforcing ring for reinforcing the stator according to claim 1, wherein said reinforcing ring further comprises a peripheral reinforcing flange extending outwardly circumferentially thereof and with said flange bearing against a portion of a major surface of said one-piece stator adjacent the hole therethrough for imparting additional stiffness to the portion of said one-piece stator surrounding the hole including said narrow bridges of said stator.

3. The combination of a stator and a reinforcing ring for the stator according to claim 1, further comprising an adhesive disposed on said one-piece stator and said reinforcing ring for bonding said reinforcing ring to said one-piece stator.

4. The combination of a stator and a reinforcing ring for the stator according to claim 1, wherein said reinforcing ring has an outer diameter in the range of about 1.2 to 2.2 mm, a width in the range of about 0.1 to 0.5 mm and a thickness in the range of about 0.15 to 1.0 mm, and wherein the stator bridge portions have respective widths of about 0.1 mm.

5. The combination of a stator and a reinforcing ring for reinforcing the stator according to claim 1, wherein said reinforcing ring further comprises a peripheral reinforcing flange extending outwardly circumferentially thereof and with said flange bearing against a portion of a major surface of said one-piece stator for imparting additional stiffness to said one-piece stator.

6. In a miniature electric motor for an electronic timepiece of the type having a stator, and a rotor mounted for rotation and positioned opposite said stator, the combination of a reinforcing ring with said stator, wherein said stator is a platelike one-piece stator of magnetizable material having a pair of opposite major surfaces and a hole defined by a sidewall extending through said one-piece stator and opening at said major surfaces and dividing said one-piece stator into a pair of stator portions connected together by narrow bridges of magnetizable material having narrow cross sections; wherein said rotor is positioned within the hole through said one-piece stator and is mounted for rotation therein; and wherein said reinforcing ring is made of non-magnetic material disposed within the hole through said one-piece stator, said reinforcing ring having a circumferential outer surface in continuous contact with a substantial portion of the sidewall of the hole through said one-piece stator and said reinforcing ring having an outer diameter effective to ensure a snug fit of said reinforcing ring within the hole through said one-piece stator to impart stiffness to a portion of said one-piece stator surrounding the hole including said narrow bridges for preventing deformation of said bridges and the hole through said one-piece stator due to mechanical impact forces to which said one-piece stator is subjected.

7. In a miniature electric motor according to claim 6, a plate having said one-piece stator mounted thereon, a bridge member opposite said plate and said one-piece stator mounted on said plate, a pair of axial rotor shaft portions extending axially from said rotor for mounting said rotor for axial rotation, wherein each of said shaft portions have respective ends mounted on said plate and said bridge member, respectively, with said rotor positioned within the hole through said one-piece stator and mounted for axial rotation therein, and wherein said reinforcing ring within the hole through said one-piece stator surrounds said rotor and has an inner diameter dimensioned for preventing said rotor from falling over when said bridge member is spaced from the axial rotor shaft end portion normally mounted on said bridge member and said rotor is otherwise unsupported.

8. In a miniature electric motor according to claim 6, wherein said reinforcing ring further comprises a peripheral reinforcing flange extending outwardly circumferentially thereof and with said flange bearing against a portion of a major surface of said one-piece stator adjacent the hole therethrough for imparting additional stiffness to the portion of said one-piece stator surrounding the hole including said narrow bridges of said stator.

9. In a miniature electric motor according to claim 6, further comprising an adhesive disposed on said one-piece stator and said reinforcing ring for bonding said reinforcing ring to said one-piece stator.

10. In a miniature electric motor according to claim 6, wherein said reinforcing ring has an outer diameter in the range of about 1.2 to 2.2 mm, a width in the range of about 0.1 to 0.5 mm and a thickness in the range of about 0.15 to 1.0 mm, and wherein the stator bridge portions have respective widths of about 0.1 mm.

11. The combination of a stator for a miniature electric motor for an electronic timepiece, and a reinforcing ring for reinforcing the stator, comprising: a platelike one-piece stator of magnetizable material having a pair of opposite major surfaces and a hole defined by a sidewall extending through said one-piece stator and opening at said major surfaces and dividing said one-piece stator into a pair of stator portions connected together by narrow portions of said one-piece stator having narrow cross sections and extending between said pair of stator portions; and a reinforcing ring made of non-magnetic material disposed within the hole through said one-piece stator, said reinforcing ring having a circumferential outer surface in continuous contact with a substantial portion of the sidewall of the hole through said one-piece stator and said reinforcing ring fixed within the hole through said one-piece stator to impart stiffness to said one-piece stator.

12. The combination of a stator and a reinforcing ring for the stator according to claim 11, further comprising an adhesive disposed on said one-piece stator and said reinforcing ring for fixing said reinforcing ring to said one-piece stator.

13. The combination of a stator and a reinforcing ring for the stator according to claim 11, consisting essentially of said one-piece stator and said reinforcing ring.

* * * * *